United States Patent Office 2,859,121
Patented Nov. 4, 1958

2,859,121

PROCESS OF MANUFACTURING COATED NUTS

Fitzhugh L. Avera, Alameda, Calif., assignor, by mesne assignments, to The Best Foods, Inc., New York, N. Y., a corporation of New Jersey No Drawing. Application July 19, 1954
Serial No. 444,395

2 Claims. (Cl. 99—126)

The invention, in general, relates to the preparation of flavorings for comestibles as well as of coated comestibles. More particularly, the invention relates to the manufacture of improved nut products which are especially useful for flavoring ice cream, candy, condiments, baked goods and other comestibles, or for a coating thereon, wherever nut flavors are desired.

The present application is a continuation-in-part of my copending application entitled Nut Products, Ser. No. 439,856, filed June 28, 1954. As in that application, whenever reference is made herein to nuts and nut bearing products such terms are intended to include peanuts, almonds, walnuts, filberts, pecans, cashew nuts as well as ice creams, condiments, baked goods or other comestibles containing any one or a combination of the aforesaid nuts. For brevity and purposes of explanation only, however, the improved process of the present invention is described herein in the environment of peanuts and peanut butter.

Those skilled in the art of manufacturing nut products and nut bearing products are aware that undesirable odors and flavors develop during manufacture and often undesirable browning of such products occurs when the products are used in aqueous bearing media or when exposed to water or water vapor. In some instances, a change in the physical state of nut products occurs, suggesting coagulation. It also is well known to those skilled in the art of roasting whole or split or chopped nuts, whether they be peanuts or other types of nuts, that the oil bath roasting common to the prior art leaves a coating of fat on the roasted nut which quickly or readily turns rancid. One need only enter a nut retailing store, where presumably fresh nuts are being oil roasted for sale, to be greeted with overpowering rancid odors. These noxious odors are observed also in theatres where oil roasted and salted nuts are sold and this is true even when the nuts are not roasted on the premises. The present invention is directed to an improved process of manufacturing roasted whole or split nuts which are free of the inherent disagreeable odors as well as obnoxious flavors and which retain their crispness and full bodied nut flavor for appreciable periods of time, as well as to provide an improved mode of manufacture of nut flavoring additives for comestibles which obviate substantially all disadvantages of prior flavorings.

A primary object of my present invention is to provide a process of manufacturing nut flavoring additives affording end products which are highly resistant to browning reaction and to development of undesirable flavors and odors as well as to coagulation in the presence of an aqueous or water bearing medium, or in the presence of water per se or water vapor.

Another important object of the invention is to provide an improved process of the indicated nature which is additionally characterized by the provision of end products which are highly pleasing in taste and aroma and which may be either mixed freely with any aqueous medium such as ice cream, and with any baking ingredients or condiment, or can be used directly as a food condiment or spread if desired.

A still further object of the present invention is to provide an improved process of the aforementioned character affording end products having apparent resistance to staling and rancidity.

Another primary object of my present invention is to provide a modified process affording coated nuts which have been rendered substantially free from loss of flavor or texture.

A still further object of the invention is to provide a modified process of the indicated nature which is additionally characterized by its moisture conditioning effect upon roasted nuts rendering the end products stable against further increase in moisture content.

A still further object of my invention is to provide an improved process of preparing coated roasted nuts which are in hygroscopic equilibrium.

Another object of the present invention is to provide improved nut flavoring additives and improved coated whole or split roasted nuts which does not appreciably increase the cost of manufacture of such type of end products.

Other objects of the invention, together with some of the advantageous features thereof, will appear from the following description of a preferred mode of manufacture as well as certain modified methods of the present invention. It is to be understood, however, that I am not to be limited to the precise embodiments hereinafter set forth nor to the precise order of the steps thereof, as the invention, as defined in the appended claims, can be followed and practiced in a plurality and variety of ways.

In its preferred form, the improved process of manufacturing nut flavoring additives of my present invention preferably comprises mixing a nut product, such as a nut butter, with an edible polyhydric alcohol in the approximate proportions of 41% by weight of the nut product and 59% by weight of the polyhydric alcohol. My improved mode of providing moisture conditioned whole or split nuts preferably comprises immersing in or otherwise contacting the roasted nuts with an aqueous solution of a polyhydric alcohol, such as "Sorbitol" or "Mannitol" or the like, draining the solution from the nuts and then dusting the nuts with salt or seasoning. As a modification, my improved process of providing coated roasted nuts preferably comprises immersing in or otherwise contacting raw nuts with a melted polyhydric alcohol such as "Sorbitol" or "Mannitol," and then effecting the roasting of the nuts by heat transferred from the melted polyhydric alcohol which is maintained at temperatures ranging between 200° F. and 400° F.

In accordance with my invention, and particularly with respect to the manufacture of improved nut flavoring additives in the environment of peanuts, I prepare in the conventional mode of manufacture familiar to those skilled in the art a quantity of peanut butter. I also prepare a volume of an aqueous solution of an edible polyhydric alcohol, preferably a polyhydric alcohol having more than three available hydroxyls in its composition. Such polyhydric alcohols are commercially available under the trademarks "Sorbitol" and "Mannitol" and, as hereinafter described with respect to modified methods of producing other or different end products, may be used either in crystal state or in solid form. In the preparation of the peanut flavoring additive, I preferably employ the polyhydric alcohol, such as "Sorbitol" or "Mannitol" in the form of an aqueous solution or as a dispersion.

My improved nut flavoring additive may be manufactured either batch-wise or by continuous processing. In the batch-type process, the prepared nut butter is first cooled to room temperature and thereafter added to a mixing vessel into which the requisite amount of an aqueous solution of the polyhydric alcohol, such as "Sorbitol" or "Mannitol" has been previously placed. As indicated above, the proportions of nut butter and polyhydric alcohol are such that the end product or nut flavoring additives comprises approximately 59% by weight of polyhydric alcohol and approximately 41% by weight of nut product, such as a nut butter, although I do not consider this proportional relationship as critical and the proportions are dependent, to some extent, upon the particular polyhydric alcohol employed as well as upon the particular comestible into which the nut flavoring additive is to be introduced. The combined nut butter and polyhydric alcohol is mixed and thoroughly agitated until a smooth blend is provided, it being understood that the aqueous solution of the "Sorbitol" or "Mannitol" is at room temperature or less than room temperature at the time of its admixture with the nut butter. A slight modification of the batch-type process of manufacturing nut flavoring additives comprises adding solid "Sorbitol" or "Mannitol" in a crystalline aggregate form, or as a powder or as pellets, to the prepared nut butter which has been cooled to room temperature. Thereafter, water is added to the mixture in the approximate amount of 17.7% by weight of the end product, and preferably distilled water, and the resultant mixture is mixed and agitated until the polyhydric alcohol is dissolved or until the water is saturated therewith and a smooth blend is effected.

My improved mode of manufacture of nut flavoring additives can be continuous, as indicated. In the continuous-type of processing, the nut product, such as peanut butter, is cooled to room temperature or less than room temperature and is continuously metered and mixed, in the approximate proportions above specified with the requisite amount of an aqueous solution of the polyhydric alcohol, such as "Sorbitol" or "Mannitol," in an intensive mixing chamber of any suitable design and the admixture agitated until a smooth blend of the mixed materials is attained. If it is desired to use polyhydric alcohol in crystalline, powdered or pellet form, the nut product and the distilled water in requisite amounts to meet the approximate proportions above indicated are continuously metered simultaneously into an intensive mixing chamber with the crystalline, powdered or pellet form of the polyhydric alcohol until a smooth admixture or blend is attained and delivered.

While I have stated hereinabove that the nut product and the polyhydric alcohol are preferably used when at room temperature or less than room temperature, satisfactory blending of these products in providing my improved nut flavoring additives has been attained where the nut product, such as nut butter is at the temperature resulting from any progressive heats normal to the preparation thereof, and the aqueous solution of the polyhydric alcohol is at any temperature between ambient and 212° F. In instances where the polyhydric alcohol is used in crystalline, powdered or pellet form, it is preferable to reduce it to its melted state or at its lowest temperature wherein it is in liquid condition.

In accordance with my present invention, I provide a preferred process and certain modified processes of manufacturing roasted nuts comprising whole or split natural nuts or nut meats or nut containing products combined with an edible polyhydric alcohol. The polyhydric alcohol can be present in or on the nut particle, in or on the nut product, or in or on the nut containing product, and the polyhydric alcohol may be present in the end product either as a crystal, or a solid or in liquified form, such as an aqueous solution or a dispersion. I have found that the added polyhydric alcohol constitutes a moisture conditioning agent in that it inhibits absorption of moisture by the nut particle, nut product or nut containing product, as well as effects a retention of the texture of the nut. That is to say, the polyhydric alcohol or, in effect, moisture conditioning agent, in or on the nut, nut product or nut containing product renders the combination stable to further increase in moisture content of the nut constituent through hygroscopic equilibration with air moisture content.

A preferred method of manufacturing roasted nuts combined with an edible polyhydric alcohol comprises the steps of roasting, blanching and shelling a quantity of nuts, such as peanuts, in a manner well known to those skilled in the art and thereafter immersing in or otherwise contacting the roasted nuts with a moisture conditioning agent comprising an aqueous solution of an edible polyhydric alcohol, preferably "Sorbitol" or "Mannitol," constituting approximately 70% of the aqueous solution. While "Sorbitol" and "Mannitol" have been indicated as the preferred polyhydric alcohol I have had satisfactory results with an edible ester of polyhydric alcohol. After the immersion of the nuts in the polyhydric alcohol, they are withdrawn and drained, and thereafter dusted with salt or other desired seasoning. The end products thus provided nuts coated with a polyhydric alcohol which constitutes a moisture conditioning agent in that the tendency for the nuts to absorb moisture from the air is inhibited and the coated nuts retain their crispness for appreciable periods. Moreover, the added polyhydric alcohol aids in preserving the texture of the coated nuts. It may be added here that the foregoing process can be practiced with chopped and split nuts as well as with whole roast nuts, and also with nut containing products.

The foregoing process of coating whole, split or chopped nuts, as well as nut containing products, can be practiced in a modified manner with raw nuts. In this modification, a quantity of raw nuts are immersed in or otherwise brought into contact with a melted polyhydric alcohol, such as "Sorbitol" or "Mannitol," thus utilizing the heat of the molten polyhydric alcohol, which is maintained at temperatures ranging between 200° F. and 400° F., to effect roasting of the raw nuts by heat transfer as well as a blending and coating of the nuts with the polyhydric alcohol. After such immersion of the nuts in the aforesaid moisture conditioning agent and when roasting of the nuts has been completed, the roasted and coated nuts are withdrawn from the molten polyhydric alcohol and drained, dusted with salt or other seasoning and set to dry.

A modification of the invention in connection with the processing of raw nuts comprises immersing in or otherwise contacting a quantity of raw nuts in an aqueous solution of "Sorbitol" or "Mannitol," the solution being approximately 70% polyhydric alcohol; bringing the temperature of the aqueous solution to approximately 212° F. to drive off the water vapors; and then raising the temperature of the melted "Sorbitol" or "Mannitol" to between 300° F. and 400° F. to effect the roasting of the nuts present and simultaneously coat the same with the polyhydric alcohol present. Thereafter, the coated and roasted nuts are withdrawn from the solution, drained, cooled and dusted with desired seasoning. The drainings may be returned to the roasting bath and fresh "Sorbitol" or "Mannitol" added to maintain the desired volume.

In all of the instances hereinabove described wherein an aqueous solution of an edible polyhydric alcohol is employed, and which may be a hexahydric alcohol "Sorbitol," as a 70% aqueous solution, the polyhydric alcohol evolves as approximately 41.8% to 59% by weight of the end product. Such polyhydric alcohol; combined with the nuts, nuts products or nut containing products, acts as a moisture conditioning agent when applied as a coating to the nuts or nut meats, to prevent further increase of moisture absorption from the air; and in the case of the nut flavoring additives the polyhydric alcohol acts in part as a stabilizer inhibiting rancidity or staling, as well as imparts a pleasing aroma to the end product.

It is to be understood that the appended claims are to be accorded a range of equivalents commensurate with the advance mode over the prior art.

I claim:

1. A process of roasting and coating nuts to render the same highly resistant to browning reaction and resistant to the development of undesirable flavors and odors; said process comprising providing a batch of molten Sorbitol, introducing a quantity of raw nuts into said batch of molten Sorbitol, maintaining the molten Sorbitol containing the raw nuts at a temperature ranging between 200° F. and 400° F. to effect a roasting of the nuts by heat transfer as well as the application of a coating of Sorbitol on each of the nuts, and thereafter removing the roasted nuts from the molten Sorbitol and draining excess Sorbitol therefrom.

2. A process of manufacturing moisture-conditioned roasted nuts; said process comprising immersing a quantity of roasted nuts in molten Sorbitol, then withdrawing the nuts from the molten Sorbitol and draining excess Sorbitol therefrom.

References Cited in the file of this patent

UNITED STATES PATENTS

| | | |
|---|---|---|
| 2,166,806 | Du Puis et al. | July 18, 1939 |
| 2,552,925 | Avera | May 15, 1951 |
| 2,631,104 | Welker | Mar. 10, 1953 |

OTHER REFERENCES

"Sorbitol" by Childs, The Manufacturing Confectioner, October 1945, pages 26 and 28.